United States Patent
Chan et al.

(10) Patent No.: US 9,455,904 B2
(45) Date of Patent: *Sep. 27, 2016

(54) MESSAGE PATH SELECTION WITHIN A NETWORK

(71) Applicant: International Business Machines Corporation, Armonk, NY (US)

(72) Inventors: Ping T. Chan, Fishkill, NY (US); Richard K. Errickson, Poughkeepsie, NY (US); Peter K. Szwed, Rhinebeck, NY (US); Ambrose A. Verdibello, Jr., Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,659

(22) Filed: Mar. 7, 2016

(65) Prior Publication Data
US 2016/0173368 A1    Jun. 16, 2016

Related U.S. Application Data

(63) Continuation of application No. 14/205,682, filed on Mar. 12, 2014.

(51) Int. Cl.
*H04L 12/707* (2013.01)
*H04L 12/863* (2013.01)

(52) U.S. Cl.
CPC ........... *H04L 45/24* (2013.01); *H04L 47/6225* (2013.01)

(58) Field of Classification Search
USPC ................................................. 370/238–437
See application file for complete search history.

(56) References Cited

U.S. PATENT DOCUMENTS

| | | |
|---|---|---|
| 7,002,917 B1 | 2/2006 | Saleh |
| 7,616,576 B2 | 11/2009 | Li et al. |
| 2004/0233850 A1 | 11/2004 | Randriamasy et al. |
| 2006/0215577 A1* | 9/2006 | Guichard ............ H04L 12/2697 370/254 |
| 2011/0032833 A1* | 2/2011 | Zhang ..................... H04L 45/70 370/252 |
| 2014/0092910 A1* | 4/2014 | Valentine .............. H04L 45/122 370/395.53 |
| 2015/0131658 A1* | 5/2015 | Wijnands ................ H04L 45/74 370/390 |

* cited by examiner

*Primary Examiner* — Charles C Jiang
*Assistant Examiner* — Kyaw Z Soe
(74) *Attorney, Agent, or Firm* — Cantor Colburn LLP; Steven Chiu

(57) ABSTRACT

Embodiments relate to path selection for packet transfer in a network. An aspect includes a method of selecting a path among a plurality of paths in a network for transfer of a packet from a first system to a second system in the network. The method includes storing, in a memory device, a static path performance vector indicating a tier among a plurality of tiers corresponding with each of the plurality of paths, each of the plurality of tiers corresponding with a relative performance level. The method also includes maintaining a path availability bit vector indicating an availability of each of the plurality of paths, and selecting, using a processor, the path among the plurality of paths based on the path performance vector and the path availability bit vector.

1 Claim, 5 Drawing Sheets

|        | path 1 | path 2 | path 3 | path 4 | path 5 | path 6 | path 7 | path 8 |
|--------|--------|--------|--------|--------|--------|--------|--------|--------|
| Tier 1 | 1      | 0      | 1      | 1      | 0      | 0      | 0      | 0      |
| Tier 2 | 0      | 1      | 0      | 0      | 0      | 0      | 1      | 0      |
| Tier 3 | 0      | 0      | 0      | 0      | 1      | 1      | 0      | 0      |
| Tier 4 | 0      | 0      | 0      | 0      | 0      | 0      | 0      | 1      |

MESSAGE PATH SELECTION WITHIN A NETWORK

DOMESTIC PRIORITY

This application is a continuation of the legally related U.S. application Ser. No. 14/205,682 filed Mar. 12, 2014, which is fully incorporated herein by reference.

BACKGROUND

The present invention relates generally to packet delivery, and more specifically, to message path selection within a network.

A number of systems may be part of a network. Each of these systems may send and receive packets from other systems within the network over one of a number of possible links or paths. While the multiple links or paths are installed within the network for redundancy, these links are not all the same.

SUMMARY

Embodiments include a method, system, and computer program product for path selection. The computer program product for implementing a path selection includes a computer readable storage medium having program instructions embodied therewith that are readable by a processor to cause the processor to perform a method. The method includes storing a static path performance vector indicating a tier among a plurality of tiers corresponding with each of the plurality of paths, each of the plurality of tiers corresponding with a relative performance level. The method also includes maintaining a path availability bit vector indicating an availability of each of the plurality of paths, and selecting, by the processor, the path among the plurality of paths based on the path performance vector and the path availability bit vector.

The method of selecting a path among a plurality of paths in a network for transfer of a packet from a first system to a second system in the network includes storing, in a memory device, a static path performance vector indicating a tier among a plurality of tiers corresponding with each of the plurality of paths, each of the plurality of tiers corresponding with a relative performance level. The method also includes maintaining a path availability bit vector indicating an availability of each of the plurality of paths, and selecting, using a processor, the path among the plurality of paths based on the path performance vector and the path availability bit vector.

A system to select a path among a plurality of paths in a network for transfer of a packet from a first system to a second system in the network includes a memory device storing a static path performance vector configured to indicate a tier among a plurality of tiers corresponding with each of the plurality of paths, each of the tiers corresponding with a relative performance level. The system also includes a processor configured to maintain a path availability bit vector indicating an availability of each of the plurality of paths and select the path among the plurality of paths based on the path performance vector and the path availability bit vector.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 2 illustrates an exemplary path performance vector according to an embodiment;

DETAILED DESCRIPTION

Embodiments described herein relate to selecting a link or path for delivery of a data packet or message from one system within a network to another.

Some previous path selection schemes consider the amount of interleaved usage on the candidate paths and select a path with the least amount of such usage. This scheme assumes that the native performance characteristics of the candidate paths are the same. Other strategies involve the use of deterministic path selection algorithms that optimize response time. These algorithms require knowledge about a number of factors related to the link itself (e.g., link length, data rate, rated bandwidth, number of simultaneous operations supported) and the present state of the link (e.g., number of operations in flight, amount of data in those operations). The algorithms require relatively large time and computing resources, as well. The embodiments described herein relate to categorizing the paths into performance tiers and using a combination of this static tier information and path availability information to select a path.

Figure 1:
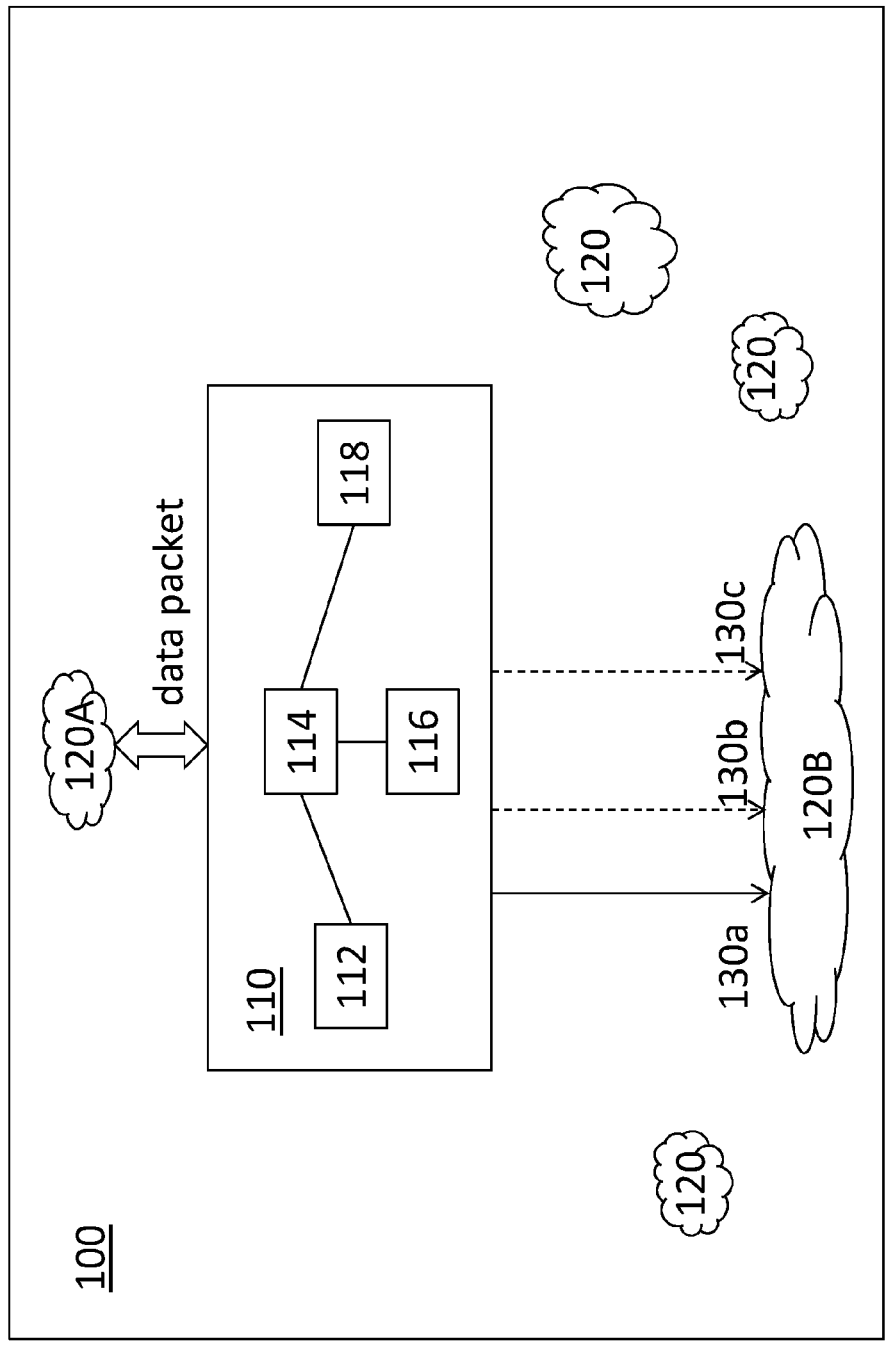
FIG. 1 is a block diagram of a path selection system within a network according to embodiments.
Figure 3:
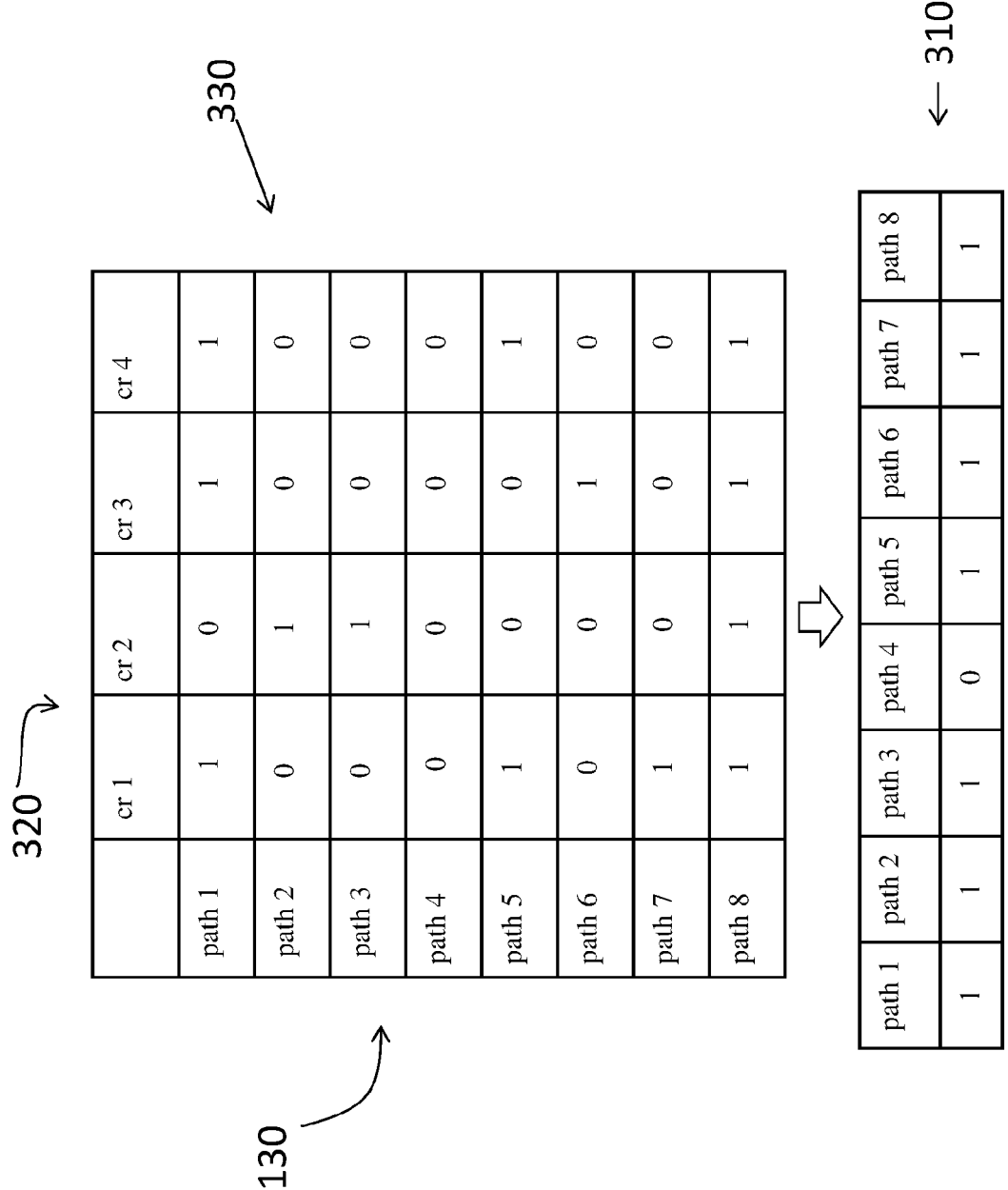
FIG. 3 illustrates an exemplary path availability bit vector according to an embodiment.

FIG. 1 is a block diagram of a path selector 110 within a network 100 according to embodiments. Systems 120A and 120B are shown as exchanging a data packet in FIG. 1, but the network 100 may include any number of other systems 120. In the exemplary network 100 shown in FIG. 1, system 120A sends a data packet to system 120B over path 130a, but other paths (130b and 130c in the example) are available, as well. Each of the systems 120 in the network 100 has access to the path selector 110. Every system 120 accesses the path selector 110 to determine a path 130 prior to sending a packet. The path selector 110 includes an input interface 112, one or more processors 114, one or more memory devices 116, and an output interface 118. In alternate embodiments, some or all of the components of the path selector 110 may be included in each of the systems 120. The memory device 116 or another memory device accessible to the path selector 110 stores a static path performance vector 210 (FIG. 2) indicating a performance tier 220 (FIG. 2) to which each path 130 is sorted. Each path 130 has intrinsic characteristics (e.g., transmission speed, bandwidth capabilities, number of physical lines) that facilitate the sorting of each path 130 into a performance tier 220, discussed further with reference to FIG. 2. Each path 130 includes one or more lines or communication resources 320 (FIG. 3). In addition to the path performance vector 210, the path selector 110 or memory device accessible by the path selector 110 maintains a path availability bit vector 310 (FIG. 3). The path availability bit vector 310 indicates availability of each path 130 based on the availability of each communication resource 320 within a path 130, as further discussed with reference to FIG. 3. The path performance vector 210 is static for a given set of paths 130. That is, the path performance vector 210 does not change unless a path is modified within, added to, or removed from the network 100. On the other hand, the path availability bit vector 310 may be updated every time the availability status of a communication resource 320 of a path 130 changes. In alternate embodiments, the path availability bit vector 310 may be updated periodically. By using the path performance vector 210 and the path availability bit vector 310, as further detailed below, the highest performance path 130 available for use by a system 120 is selected.

FIG. 2 illustrates an exemplary path performance vector 210 according to an embodiment. In the example shown in FIG. 2, eight paths 130 sorted into four tiers are available to carry packets between systems 120 within the network 100. As shown in the exemplary path performance vector 210, the tier 220 in which a path 130 is sorted may be indicated with a one, while other tiers 220 are indicated with a zero. For example, path 1, path 3, and path 4 are indicated as being in Tier 1, while path 2 is indicated as being in Tier 2. The ordering of the tiers 220 may correspond with performance. For example, Tier 1 220 may include paths 130 with the fastest transmission speeds while Tier 4 220 includes paths 130 with the slowest transmission speeds, as indicated in FIG. 2. Each row (tier 220) shown in FIG. 2 may correspond with a byte, with each bit within each byte indicating whether or not a particular path 130 is in the corresponding tier 220. As should be clear, no two bytes could have the same bits set (i.e., no path 130 could be in more than one tier 220). For example, byte index 0 may correspond with tier 220 Tier 1 (first row) and byte index 3 may correspond with tier 220 Tier 4 (row 4).

When available, a path 130 in the highest performance tier 220 is selected. For the example shown in FIG. 2, if any of the paths 130 path 1, path 3, or path 4 is available, the path 130 would be selected. When more than one path 130 is available in the highest performance tier 220 (e.g., all of the paths 130 path 1, path 3, and path 4 are available), then the paths 130 path 1, path 3, and path 4 may be selected in turn or in a round-robin fashion based on subsequent path requests from systems 120. The number of tiers 220 may be selected based on a range of characteristics exhibited by the paths 130. Alternately, a number of tiers 220 may be predefined and the characteristics of the paths 130 may be sorted according to the number of available tiers 220. As noted above, the path performance vector 210 is static until a change (modification, addition, removal) of a path 130 occurs in the network 100.

FIG. 3 illustrates an exemplary path availability bit vector 310 according to an embodiment. The derivation of the path availability bit vector 310 from a communication resource availability vector 330 is described. Eight paths 130, each having four communication resources 320 are shown in the example. As shown, the path availability bit corresponding to a communication resource 320 that is available may be one while the path availability bit corresponding to a communication resource 320 that is not available may be zero. For example, communication resources 320 cr 1, cr 3, and cr 4 for path 130 path 1 are indicated as being available while communication resource 320 cr 2 of path 130 path 1 is indicated as unavailable. When a path 130 has no available communication resources 320 (e.g., path 130 path 4 in FIG. 3), that path 130 is unavailable and cannot be selected to deliver a packet. This information is reflected in the path availability bit vector 310. In the example, only path 130 path 4 is unavailable. Thus, only the bit in the path availability bit vector 310 corresponding to path 130 path 4 is zero.

Figure 4:
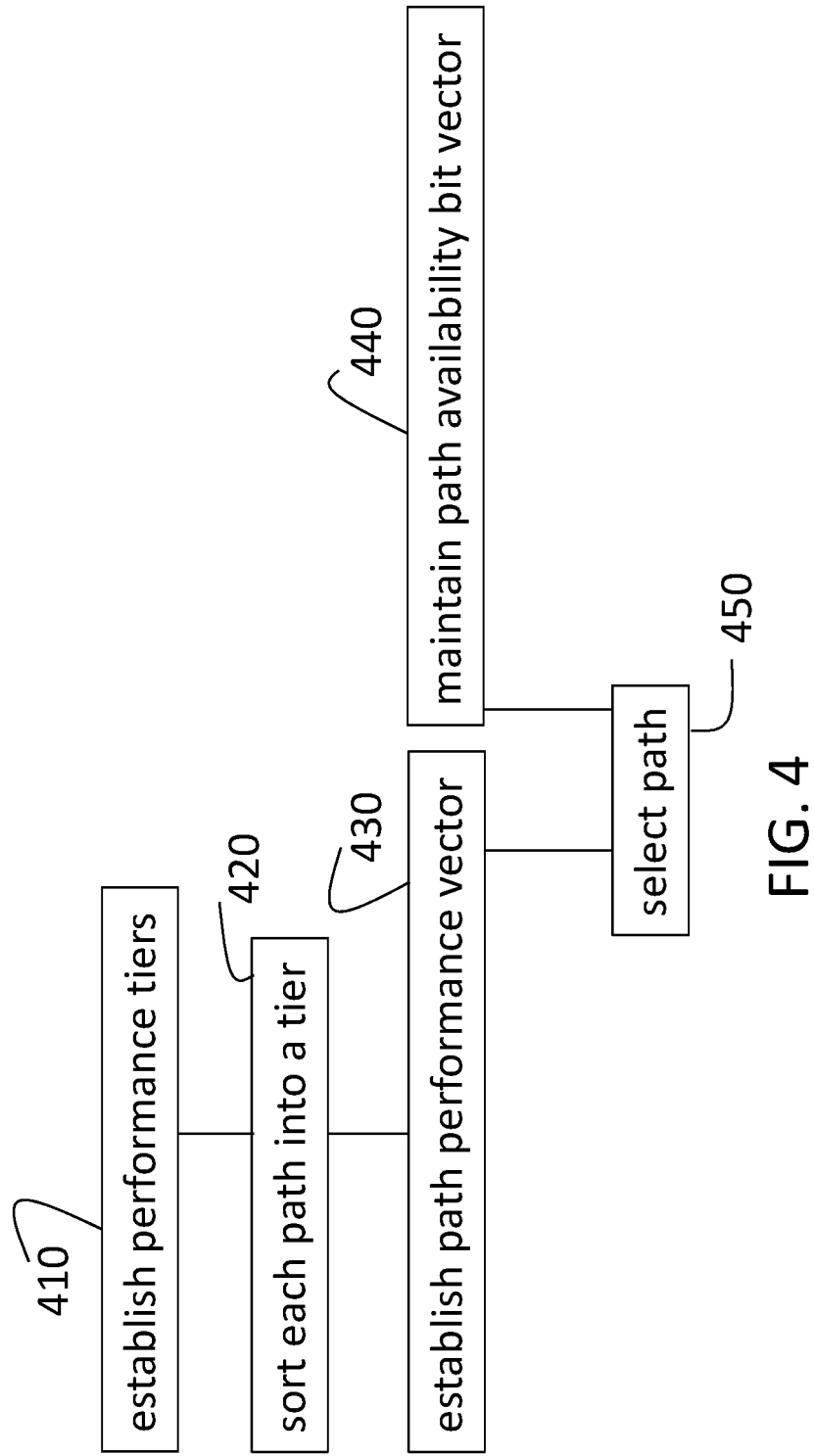
FIG. 4 shows the process flow of a method of selecting a path to transfer a packet within a network according to embodiments described herein.

FIG. 4 shows the process flow of a method of selecting a path 130 to transfer a packet within a network 100 according to embodiments described herein. At block 410, establishing performance tiers 220 includes ordering of the performance tiers 220. That is, the tiers 220 are ranked by performance level (e.g., by tiers 220 representing the fastest channels to tiers 220 representing the slowest channels). At block 420, sorting each path 130 into a corresponding tier 220 may be based on link speed or another characteristic of the paths 130. At block 430, the sorting of each path 130 into a tier 220 is used to establish a path performance vector 210 (see e.g., FIG. 2) that is static for a given set of paths 130. At block 440, maintaining a path availability bit vector 310 (see e.g., FIG. 3) involves updating the bit corresponding to each path 130 based on availability of communication resources 320 of the path 130 as discussed with reference to FIG. 3. Based on the static path performance vector 210 and the path availability bit vector 310, selecting a path 130, at block 450, is executed as detailed below with reference to FIG. 5.

Figure 5:
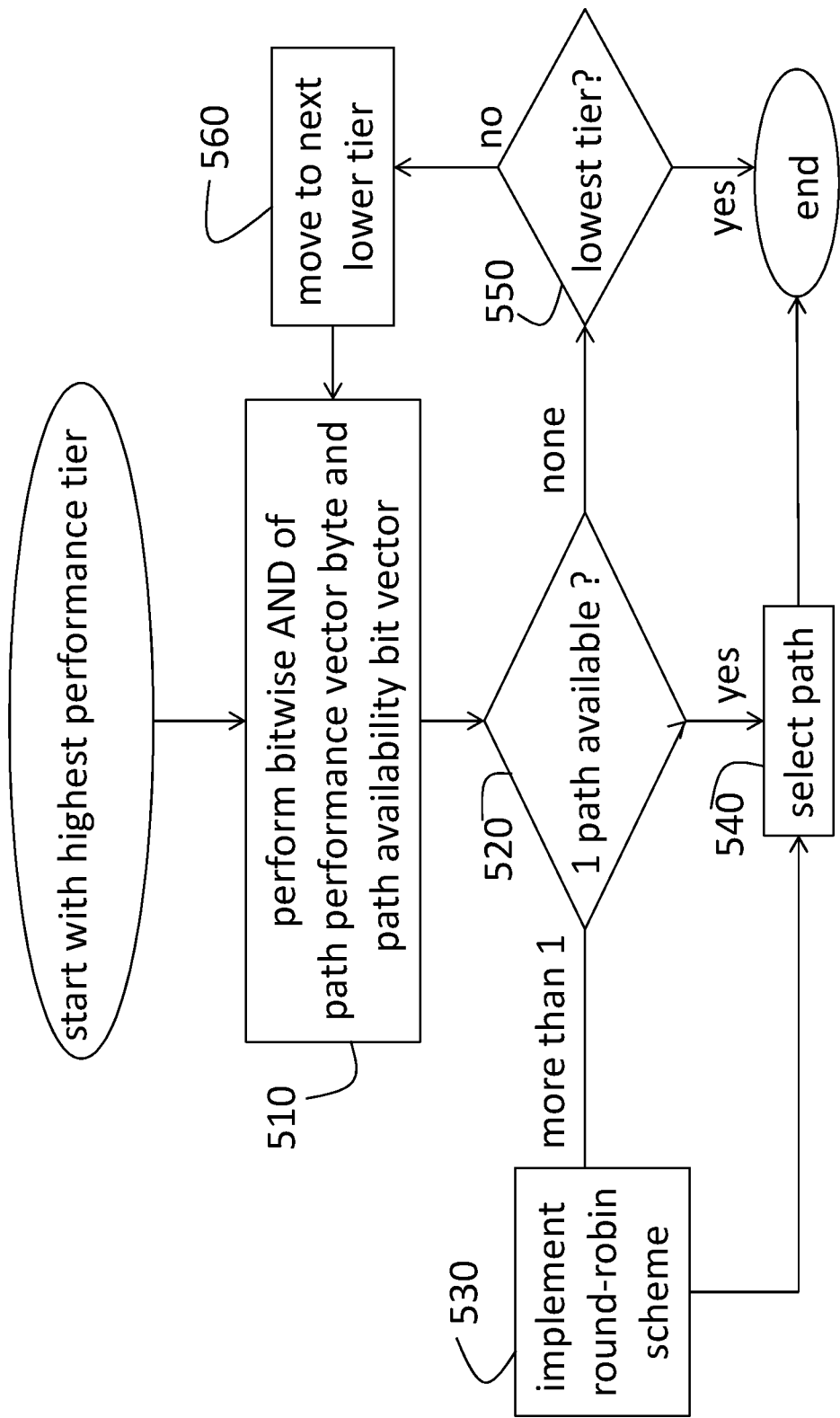
FIG. 5 is a flow diagram of the path selection process according to an embodiment.

FIG. 5 is a flow diagram of the path 130 selection process according to an embodiment. Beginning with the byte corresponding to the highest performance tier 220 (e.g., first row corresponding to tier 220 Tier 1 in FIG. 2), a bitwise AND operation is performed at 510 of the path performance vector 210 byte and the path availability bit vector 310 (see e.g., FIG. 3). With the first row of the exemplary path performance vector 210 shown in FIG. 2 and the path availability bit vector 310 shown in FIG. 3, the following AND operation would be performed:

$$[10110000] \text{AND} [11101111] = [10100000]] \qquad [\text{EQ. 1}]$$

According to the process flow shown in FIG. 5, the result of the bitwise AND is checked at 520. The result of EQ. 1 indicates that path 1 and path 3 are in the highest performance tier 220 and are available for selection. This result, when checked at 520, would lead to the implementation of a round-robin scheme (530) to use path 1 and path 3 in turn. In this case, path 1 may be selected at 540. If the result (at 510) had included only one "1," then the corresponding path would be selected at 540. If the result (of 510 checked at 520) had been all zeroes, indicating that no paths 130 were available in the highest performance tier 220, then, at 550, it would first be checked whether the current tier 220 were the lowest performance tier 220 (i.e., all the tiers 220 have been checked). If the outcome of the check at 550 is that the current tier 220 is the lowest performance tier 220, then the process comes to an end because no paths 130 were available in any of the tiers. If the outcome of the check at 550 is that the current tier 220 is not the lowest performance tier 220, then the next highest performance tier 220 is selected at 560 (i.e., the next row in the path performance vector 210 shown in FIG. 2 is selected) and the bitwise AND is performed again at 510, iteratively as shown.

Technical effects and benefits include selection of the highest performance path available to transport a packet based on updating availability information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing a path selection, the computer program product comprising:
   a non-transitory computer readable storage medium having program instructions embodied therewith, the program instructions readable by a processor to cause the processor to perform a method comprising:
     storing a static path performance vector indicating a tier among a plurality of tiers comprising two or more tiers corresponding with each of a plurality of paths comprising two or more paths, each of the plurality of tiers corresponding to a performance level within a range of values;
     maintaining a path availability bit vector indicating an availability of each of the plurality of paths, wherein the maintaining the path availability bit vector includes setting a corresponding bit to indicate unavailability when every communication resource of a path among the plurality of paths is in use;
     selecting, by the processor, the path among the plurality of paths based on the path performance vector and the path availability bit vector, wherein the selecting the path includes performing an AND operation on the path availability bit vector and a byte of the path performance vector corresponding with a tier among the plurality of tiers, the AND operation indicating paths among the plurality of paths that are both available and sorted into the tier among the plurality of tiers;
       wherein the performing the AND operation is done iteratively beginning with the byte of the path performance vector corresponding to a highest performance tier among the plurality of tiers and continuing with the byte of the path performance vector corresponding to a next highest performance tier until an available path among the plurality of paths is indicated;
       wherein when the performing the AND operation indicates two or more paths among the plurality of paths that are both available and sorted into the tier among the plurality of tiers, each of the two or more paths is selected in turn in a round-robin fashion;
     establishing the path performance vector based on sorting each of the plurality of paths into the respective tier among the plurality of tiers based on a link speed of each of the plurality of paths;
     ranking the plurality of tiers according to the respective performance level within the range of values; and
     updating the path performance vector when a path among the plurality of paths is added, removed, or modified.

* * * * *